United States Patent [19]

Taig

[11] Patent Number: 4,944,372
[45] Date of Patent: Jul. 31, 1990

[54] ELECTRICALLY ACTUATED BRAKING SYSTEM

[75] Inventor: Alistair G. Taig, Edwardsburg, Mich.

[73] Assignee: Allied-Signal Inc., Morristown, N.J.

[21] Appl. No.: 284,517

[22] Filed: Dec. 15, 1988

[51] Int. Cl.$^5$ ............................................. B60T 13/74
[52] U.S. Cl. ..................................... 188/156; 74/650; 188/72.1
[58] Field of Search ................. 188/156.2 D, 157, 162, 188/171, 151, 72.1, 72.2, 72.3; 74/650

[56] References Cited

U.S. PATENT DOCUMENTS

| | | | |
|---|---|---|---|
| 1,282,614 | 10/1918 | Miller | 74/650 |
| 2,139,405 | 12/1938 | Frederickson | 74/650 |
| 2,651,214 | 9/1953 | Randall | 74/650 |
| 2,938,407 | 5/1960 | Nallinger et al. | 74/650 |
| 2,967,438 | 1/1961 | Altmann | 74/650 |
| 3,111,043 | 11/1963 | Panhard | 74/650 |
| 4,603,594 | 8/1986 | Grimm | 188/151 A X |
| 4,795,002 | 1/1989 | Burgei et al. | 188/156 X |

*Primary Examiner*—Andres Kashnikow
*Assistant Examiner*—Matthew C. Graham
*Attorney, Agent, or Firm*—Larry J. Palguta; Ken C. Decker

[57] ABSTRACT

The electrically actuated braking system (10) comprises a controller mechanism (14) that may be activated by a switch (12). The controller mechanism (14) sends a signal to an electric drive motor (20), and receives braking force signals from a sensor (16) connected to one of two braking members (18, 19) connected with the drive motor (20). The drive motor (20) is operated by the controller mechanism (14) in order to rotate a drive member (31) of a load-equalizing differential (30), the load-equalizing differential (30) being connected by a flexible drive connection mechanism (50) with the braking members (18, 19). The load-equalizing differential (30) comprises the drive member (31) having a plurality of circumferentially spaced-apart openings (34) each of which receives therein a ball member (36, 36A). Disposed about the drive member (31) and balls (36, 36A) and facing each other are two plates (40, 42) each of which is connected with a segment of the flexible drive connection mechanism (50). Each plate (40, 42) has series of ramps (44) and cam tracks (46) which are shaped complementary to the ramps (44) and cam tracks (46) of the other plate (40, 42). Rotation of the drive member (31) by the drive motor (20) causes rotation of the plates (40, 42) so that equal torque may be applied, via the flexible drive connection mechanism (50), to the braking members (18, 19).

21 Claims, 5 Drawing Sheets

ELECTRICALLY ACTUATED BRAKING SYSTEM

The present invention relates generally to electrically actuated braking systems, and in particular to electrically actuated parking brake systems that are operated by a mechanical connection between the drive motor and braking mechanisms.

Electrically actuated braking mechanisms have been proposed previously. Some comprise electrically actuated parking brake systems which operate various electrical devices in order to effect operation of one or more parking brakes. It is highly desirable to provide an electrically actuated braking system which may be utilized as a parking brake system wherein a single motor operates the braking mechanisms via direct mechanical connections. It is advantageous to eliminate the presence of electrical motors and such at or within the housing of the braking mechanisms so that the braking mechanisms utilized for parking brake actuation are greatly simplified. An additional advantage is that each parking brake mechanism may be separated from an associated hydraulic service brake so that there are no additional seals or connections that can reduce service brake reliability.

The present invention provides a solution to the above problems and fulfills a need for an electrically actuated braking system, comprising controller means connected with drive motor means, the controller means for sending signals to control operation of the drive motor means, the drive motor means operating a load-equalizing differential which is connected with flexible drive connection means, the flexible drive connection means connected with brake members, the load-equalizing differential comprising a drive member disposed between two opposed plates and having a plurality of openings receiving therein ball means, each opposed plate having ramps connected with cam tracks, the ramps and cam tracks of one plate shaped complementary with the ramps and cam tracks of the opposed plate, the controller means effecting operation of the drive motor which rotates the drive member, rotation of the drive member effecting via the ball means rotation of the opposed plates which may move relative to one another so that equal torque may be transmitted to the brake members.

One way of carrying out the invention is described in detail below with reference to the drawings which illustrates an embodiment in which.

Figure 1:
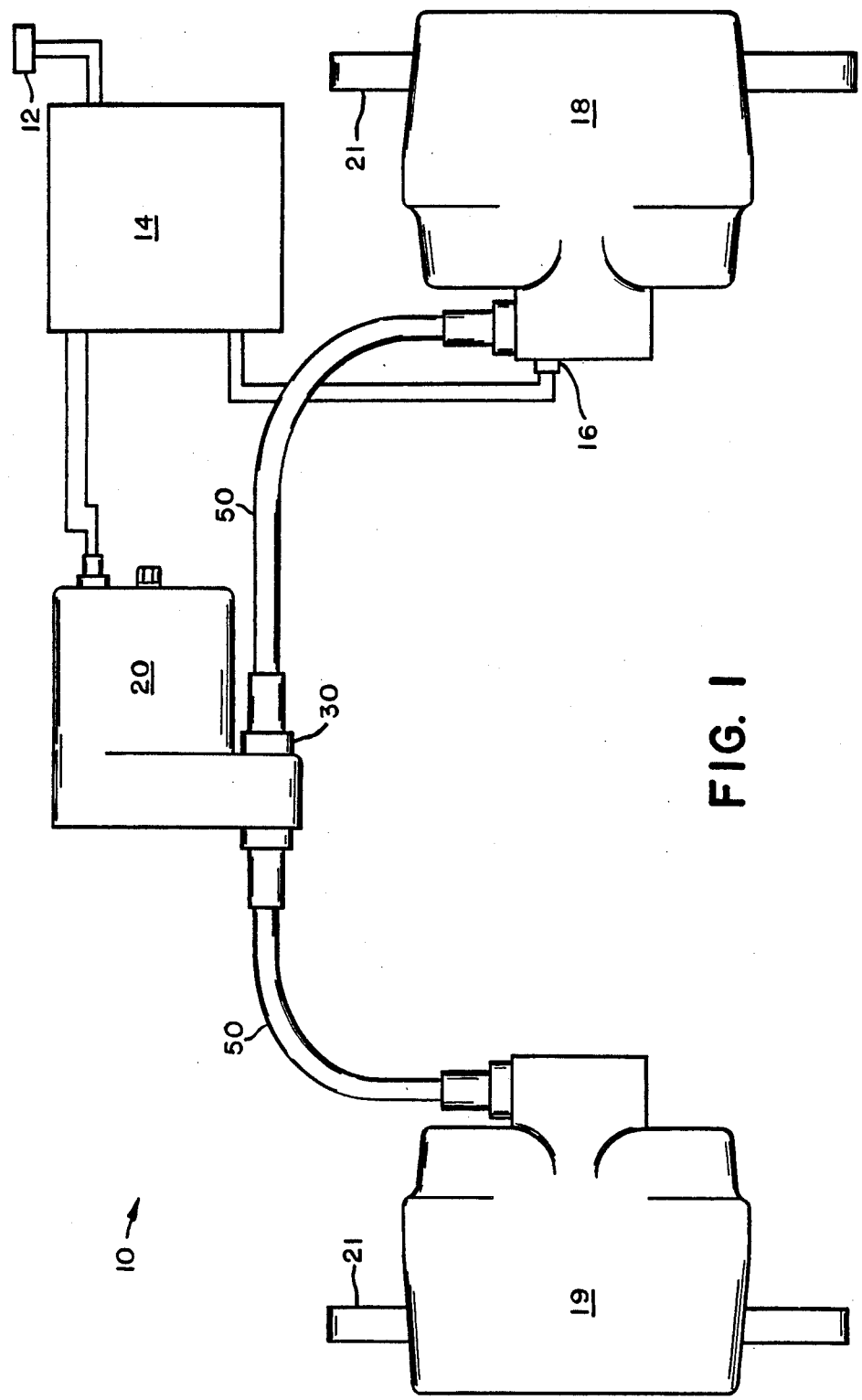
FIG. 1 is a schematic illustration of the electrically actuated braking system of the present invention.

The electrically actuated braking system of the present invention is designated generally by reference numeral 10 in FIG. 1. A parking switch 12 is connected with electronic controller means 14 which receives signals from a back-off sensor mechanism 16. Back-off sensor mechanism 16 is connected to a braking member or disc brake 18. Disc brake 18 is identical to disc brake 19 disposed at the opposite side of the vehicle. Controller means 14 is connected with an electric drive motor 20 which operates a load-equalizing differential 30. Load-equalizing differential 30 operates flexible drive connections 50 which are connected with the disc brakes 18, 19. Each disc brake can engage an associated rotor 21 in order to effect braking of the vehicle (not shown). Sensor 16 senses the brake pad clearance effected by disc brake 18 and transmits signals to the controller means. Electric drive motor 20 is utilized to drive the two disc brakes 18, 19 through the flexible drive connections or shafts 50. The torque transmitted by motor 20 to each flexible drive connection 50 is equalized by the differential 30 which enables one drive connection segment to make more turns than the other during the application phase, but which effects a locking on the release cycle. The control logic of controller means 14 counts the motor turns during the application cycle of operation and stops the electric drive motor 20 when the required number of turns is reached. A "release" of the system 10 causes motor 20 to reverse until the sensor 16 signals controller means 14 that a predetermined clearance has been achieved between the actuating mechanism of the disc brake and the associated brake pad. This clearance is maintained regardless of brake wear. If the service brakes happen to be applied when the brakes of the braking system are being released (a common situation on hills), the sensor 16 will shut off electric drive motor 20 too soon (due to caliper deflection caused by service brake operation), but when the service brakes are released, the motor 20 will restart and fully release disc brakes 18, 19.

Figure 2:
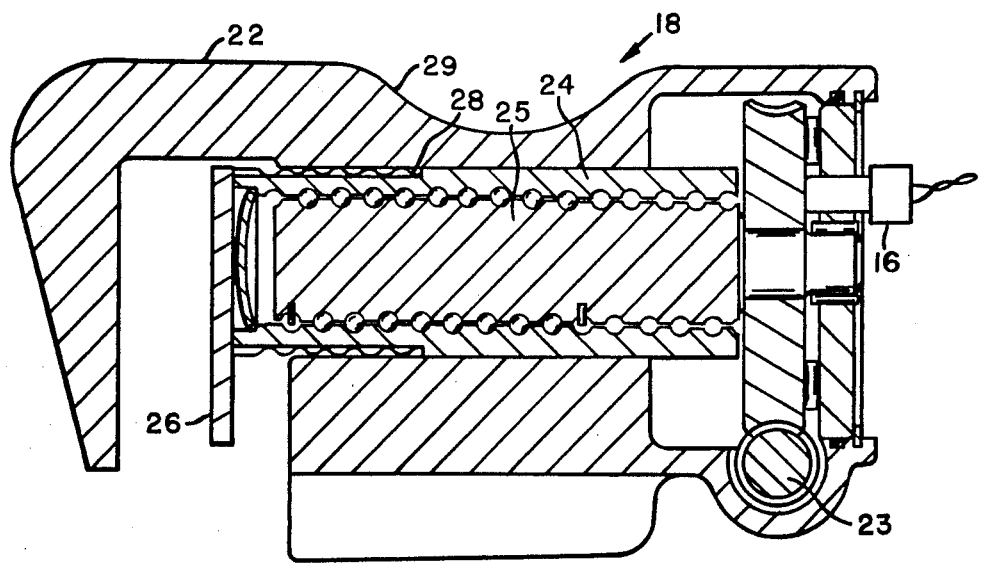
FIG. 2 is a section view of a disc brake utilized in the braking system.
Figure 3:
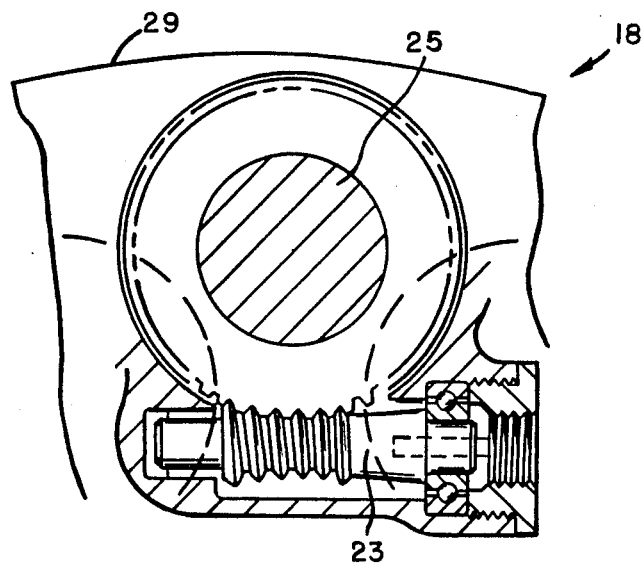
FIG. 3 is a partial end section view of the disc brake of FIG. 2.

FIG. 2 illustrates a braking member or disc brake 18 or 19 that may be utilized as part of the invention. The disc brake includes a caliper 22 which houses a worm gear 23 connected to an associated flexible drive connection segment 50. Worm gear 23 engages a wheel of screw member 25 disposed within sleeve 24. A corrugated plastic seal 28 may be provided in order to effect a seal between sleeve 24 and housing 29. Such a seal will eliminate a seal groove in housing 29. Sleeve 24 and screw member 25 have complementary shaped grooves in which are disposed a non-recirculating ball bearing means. The sleeve, screw member, and non-recirculating ball bearing means are described in detail in co-pending Ser. No. 105,756 entitled "*Electrically Actuated Disc Brake*" assigned to the same assignee as herein and incorporated by reference herein. When worm gear 23 is rotated by the flexible drive connection 50, worm gear 23 causes screw member 25 to rotate and effect axial displacement of sleeve 24 against the associated inner brake pad 26 so that the caliper 22, by reaction, displaces the associated outer brake pad (not shown) against the respective rotor 21. During the release phase, position sensor 16 connected with braking member 18 will signal the separation of the sleeve 24 from the inner brake pad 26. This separation will occur when the axial load on the screw member 25 is zero and the screw member continues to back off.

Figure 4:
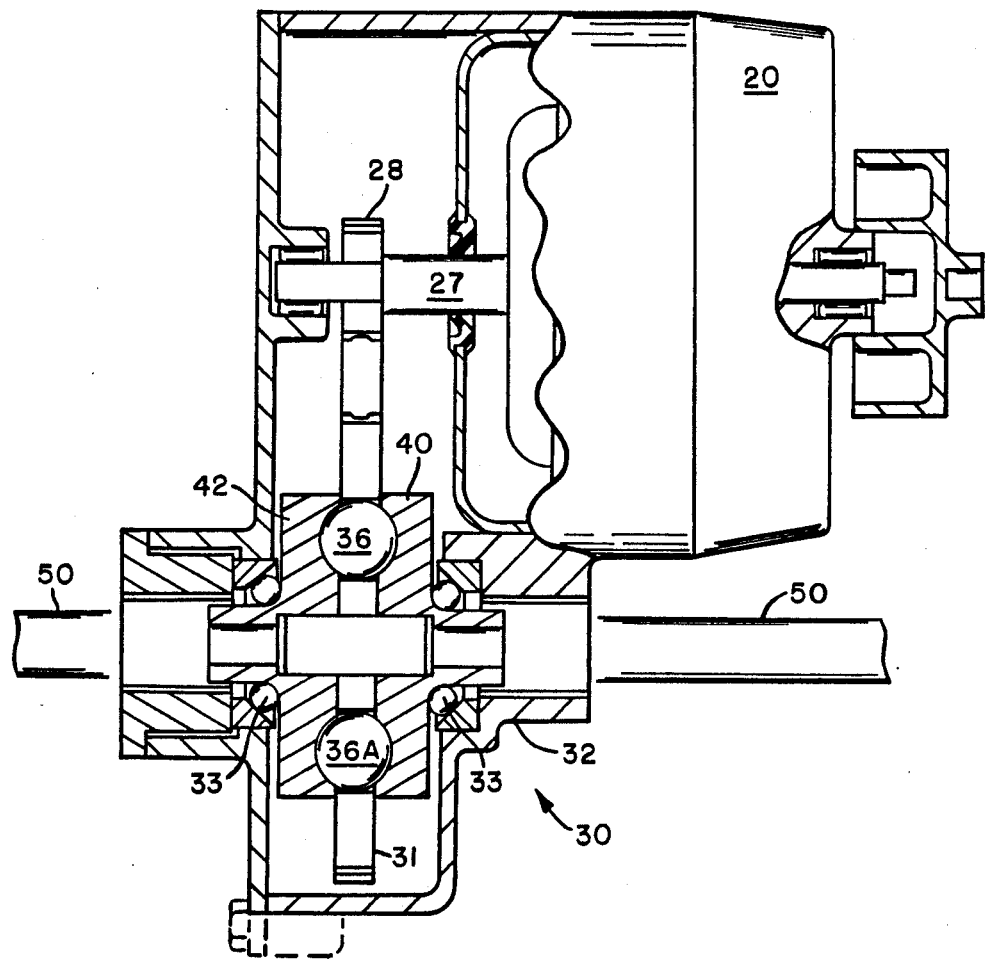
FIG. 4 is a partial cutaway and section view of the drive motor and differential of the braking system.
Figure 5:
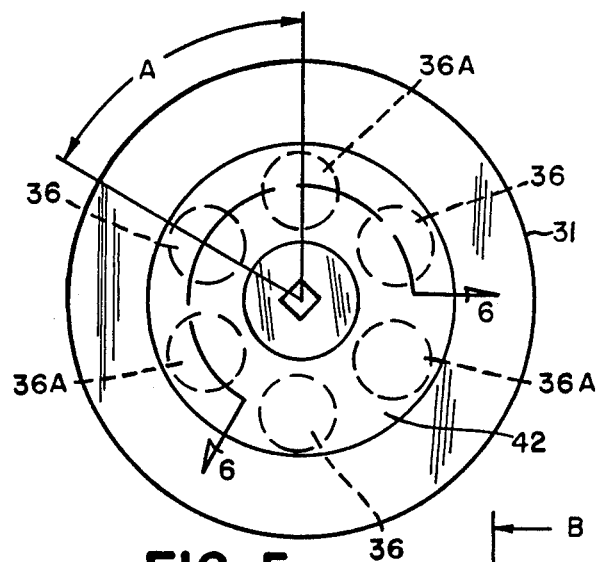
FIG. 5 is an end view of certain parts of the load-equalizing differential.
Figure 6:
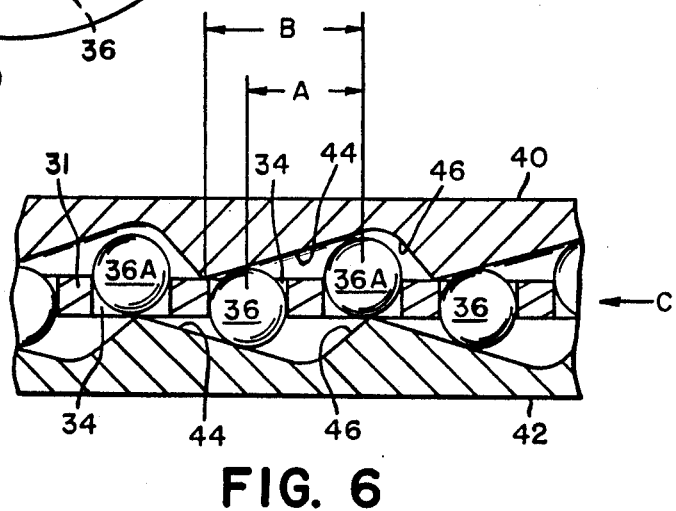
FIG. 6 is a section view taken along view line 6—6 of FIG. 5.
Figure 7:
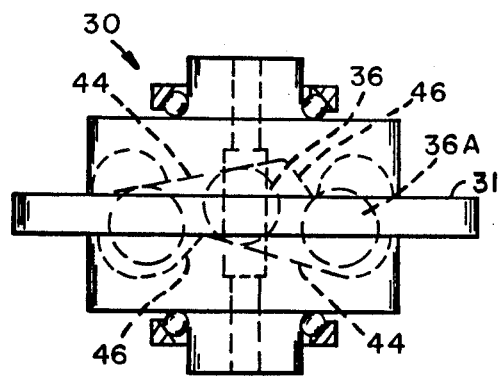
FIG. 7 is a top and partial section view of certain parts of the load-equalizing differential.

FIG. 4 illustrates the electric drive motor 20 and load-equalizing differential 30. Motor 20 operates a drive shaft 27 that rotates a tooth drive belt 28. Tooth drive belt 28 engages and drives a drive member 31 of differential 30. Differential 30 is mounted within the drive motor housing 32 by means of bearings 33. Drive member 31 comprises essentially a pulley which includes therein a pluralitY of circumferentially spaced-apart openings 34 (see FIG. 6). The present embodiment includes six openings 34 disposed within pulley 31, each of the openings having therein either an engaging or ball means 36 or 36A. Located about ball means 36, 36A is a pair of plate members 40 and 42 which are connected with respective flexible drive connection segments 50. As illustrated in FIG. 5, the drive member 31 positions the six balls means 36, 36A equidistantly about the pulley 31 so that they are approximately sixty degrees apart. The angle between the ball means, approximately 60 degrees, comprises the pitch A of the balls. As illustrated in FIG. 6, each of the plates 40 and 42 includes complementary ramps 44 and cam tracks 46. The ball means 36, 36A are disposed between the respective ramps 44 and cam tracks 46.

The differential 30 transmits the drive from drive member 31 to the plates 40, 42 in such a manner that one plate can rotate faster than drive member 31 and the other plate can rotate an equal amount slower than drive member 31. This action is required only in one direction of rotation, during the application phase of the braking system, while in the reverse direction of rotation differential 30 locks and all members rotate at the same speed. Referring to FIG. 6, if drive member 31 is being rotated by motor 20 in the direction of arrow C, and the torque required to turn each plate 40, 42 is the same, the plates will be driven to the left at the same speed as drive member 31. However, if one plate requires more torque (for example plate 42) than the other plate (plate 40), then plate 42 will lag behind drive member 31 and force the balls 36, 36A toward plate 40. This causes plate 40 to move to the left at a faster rate than drive member 31. By selecting the geometry of cam tracks 46 such that ramps 44 cover an arc of rotation (distance B) greater than the pitch A of the balls 36, 36A, motion can be transferred from balls 36 to balls 36A without interruption as plate 42 lags behind and plate 40 advances equally ahead of drive member 31. The arc of rotation B is defined essentially as the length of a ramp 44 from the end point between a ramp and a cam track to the bottom of a ramp where it engages an associated cam track. As a result of the above function, equal torque is transmitted to each plate 40, 42 because the angles of ramps 44 are equal and the force on the balls must be balanced. During reverse operation by drive motor 20, the angles on the faces of cam tracks 46 are steeper than the angles of ramps 44 such that the drive of plates 40, 42 effected by a ball 36 which is engaging tracks 46 will not be transferred to the adjacent ball 36A during reverse rotation. As a result, the operation of disc brakes 18 and 19 via flexible drive connections 50 can be effected by a single electric drive motor 20 through the intermediary of load-equalizing differential 30, so that each caliper receives an equal application of braking torque regardless of the initial positions of components within each respective disc brake.

One advantage of the flexible drive shaft arrangement is that the motor and differential can be mounted on the vehicle frame and the danger of electrical wiring or connector fatigue failure is minimized.

Controller means 14 may contain controller logic that is based on either turn counting or caliper clamp force in order to avoid compounding the service and parking brakes. The datum for turn counting would be determined by back-off sensor 16 in caliper 18. The drive motor 20 could apply sufficient output to effect operation of the disc brakes and provide the required holding forces for effecting braking of the appropriate size vehicle. Minimal power would be required for back-off because the sleeves, ball bearings, and screw mechanisms of the disc brakes are fully reversible. Switching for the release application of the brakes is governed by the driver's control of switch 12 and the operation of back-off sensors 16. The two components could be connected in series so that when switch 12 is in the release position, the sensors 16 will cause the motor to operate whenever there is insufficient brake shoe clearance.

Figure 8:
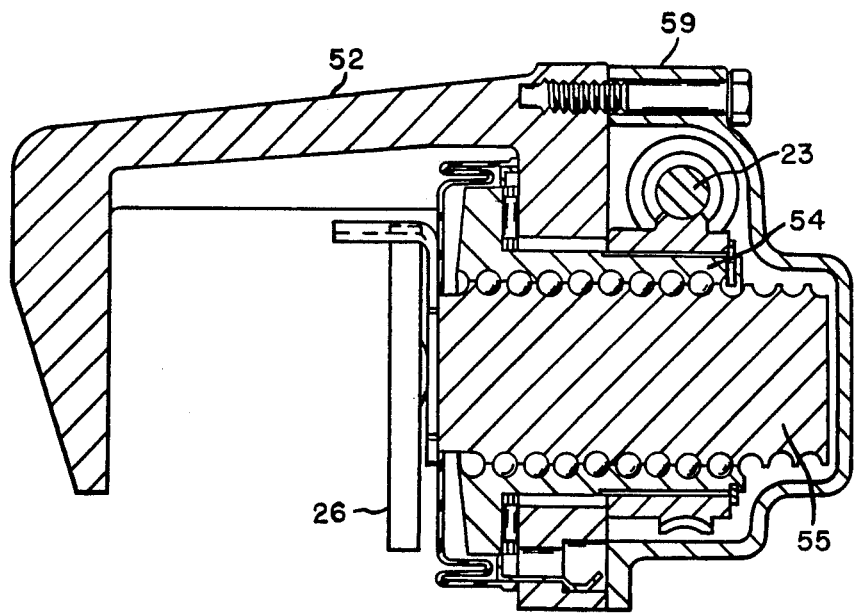
FIG. 8 is a section view of an alternative disc brake that may be utilized in the braking system.
Figure 9:
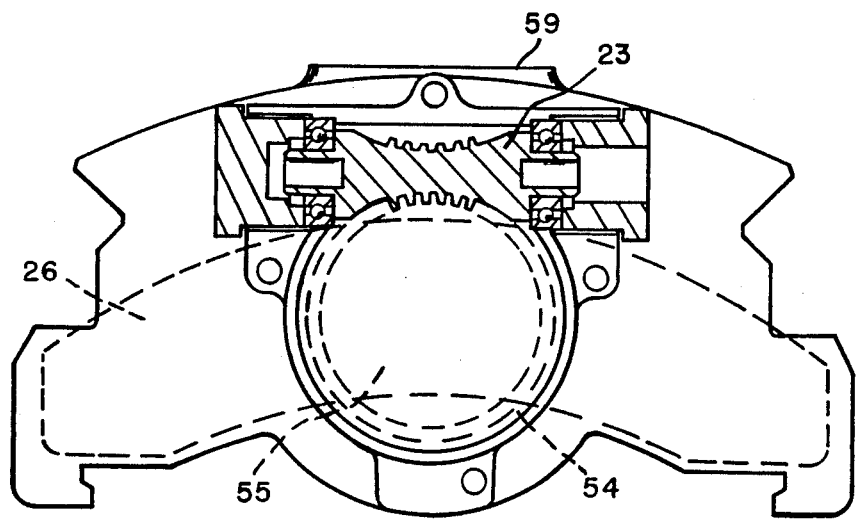
FIG. 9 is a partial end section view of the disc brake of FIG. 8.

The alternative caliper brake 18 illustrated in FIGS. 8 and 9 does not incorporate a sensor 16 as described above. FIGS. 8 and 9 illustrate a caliper without a sensor. The caliper 52 of brake 18 includes a housing 59 for the worm gear 23 which drives, through a worm wheel, a sleeve 54 that displaces axially a screw member 55. The screw member displaces inner brake pad 26 and causes the caliper 52 to displace, by reaction, the outer brake pad (not shown).

A slightly different control logic is needed when the sensor is omitted. The motor current is monitored by the controller, and when the rise in current due to onset of brake shoe load is sensed, a datum motor position is established. The motor turns are then counted from this datum in order to apply the desired clamp load. On release, the motor turns are counted back beyond the datum in order to ensure complete release of the brakes. This control logic eliminates the need for a sensor and removes all electrical connections from the 'live' vehicle axle.

Various modifications of the above-described embodiment of the invention will be apparent to those skilled in the art. It is to be understood that such modifications can be made without departing from the scope of the invention.

I claim:

1. An electrically actuated braking system, comprising controller means connected with drive motor means, the controller means for sending signals to control operation of the drive motor means, the drive motor means operating a load-equalizing differential which is connected with flexible drive connection means, the flexible drive connection means connected with brake members, the load-equalizing differential comprising a drive member disposed between two opposed plates and having a plurality of openings receiving therein ball means, each opposed plate having ramps connected with cam tracks, the ramps and cam tracks of one plate shaped complementary with the ramps and cam tracks of the opposed plate, the controller means effecting operation of the drive motor means which rotates the drive member, rotation of the drive member effecting via the ball means rotation of the opposed plates which move relative to one another so that equal torque is transmitted to the brake members.

2. The braking system in accordance with claim 1, wherein the ramps cover an arc of rotation greater than the pitch of the ball means.

3. The braking system in accordance with claim 2, wherein the flexible drive connection means comprises a flexible cable extending between a respective plate and braking member.

4. The braking system in accordance with claim 1, wherein the ball means comprises ball members and each cam track is positioned at a steeper angle than the associated ramp such that during reverse rotation of said drive member, displacement of the plates by a ball member results in a continuous displacement of the plates by said ball member without said displacement being caused by an adjacent ball member.

5. The braking system in accordance with claim 4, wherein the drive motor means rotates a belt which engages the circumference of said drive member and effects rotation thereof.

6. The braking system in accordance with claim 5, wherein each ball member is disposed approximately 60° apart from an adjacent ball member in the rotational plane of the opposed plates.

7. The braking system in accordance with claim 1, wherein each of the brake members comprises a disc brake which engages a respective rotor.

8. The braking system in accordance with claim 7, wherein at least one of the disc brakes includes gear means operated by the flexible drive connection means so that the gear means effects rotation of a screw member which causes axial displacement of sleeve means connected therewith.

9. The braking system in accordance with claim 7, wherein at least one of the disc brakes includes gear means operated by the flexible drive connection means so that the gear means effects rotation of sleeve means which causes axial displacement of a screw member connected therewith.

10. The braking system in accordance with claim 1, further comprising sensor means for sending braking force signals to said controller means.

11. A load-equalizing differential, comprising a drive member disposed between two opposed plates and having a plurality of openings receiving therein ball members, each opposed plate having ramps connected with cam tracks, the ramps and cam tracks of one plate shaped complementary with the ramps and cam tracks of the opposed plate, the ball members engageable with the ramps and cam tracks, and each plate connected to a flexible connection connected with a respective brake member, so that operation of the drive member effects via the ball members operation of the opposed plates which move relative to one another so that equal torque is transmitted thereby.

12. The load-equalizing differential in accordance with claim 11, wherein each ball member is disposed approximately 60° apart from an adjacent ball member in the rotational plane of the opposed plates.

13. An electrically actuated braking system, comprising controller means connected with drive motor means, the controller means for sending signals to control operation of the drive motor means, the drive motor means operating a load-equalizing differential which is connected with flexible drive connection means, the flexible drive connection means connected with brake members, the load-equalizing differential comprising a drive member and two opposed and symmetrically shaped members having engaging means therebetween, the controller means effecting operation of the drive motor means which rotates the drive member, rotation of the drive member effecting rotation of the symmetrically shaped members and engaging means so that equal torque is transmitted to the brake members, the differential effecting the differentiation of torque in an apply direction of rotation and locking together the shaped members in a reverse direction of rotation.

14. The braking system in accordance with claim 12, wherein the flexible drive connection comprises a flexible cable extending between a respective shaped member and brake member.

15. The braking system in accordance with claim 13, wherein the engaging means comprises engaging members wherein each engaging member is disposed approximately 60° apart from an adjacent engaging member in the rotational plane of the symmetrically shaped members.

16. The braking system in accordance with claim 13, wherein at least one of the brake members includes gear means operated by the flexible drive connection means so that the gear means effects rotation of a screw member which causes axial displacement of sleeve means connected therewith.

17. The braking system in accordance with claim 13, wherein at least one of the brake members includes gear means operated by the flexible drive connection means so that the gear means effects rotation of sleeve means which causes axial displacement of a screw member connected therewith.

18. The braking system in accordance with claim 13, further comprising sensor means for sending braking force signals to said controller means.

19. A load-equalizing differential, comprising a drive member disposed between two opposed plates and having a plurality of openings receiving therein ball members, each opposed plate having ramps connected with cam tracks, the ramps and cam tracks of one plate shaped symmetrical with the ramps and cam tracks of the opposed plate, the ball members engageable with the ramps and cam tracks so that operation of the drive member effects via the ball members operation of the opposed plates which move relative to one another so that equal torque is transmitted by half of the ball members, the differential effecting the differentiation of torque in an apply direction of rotation and locking together the plates in a reverse direction of rotation.

20. The load-equalizing differential in accordance with claim 19, wherein each ball member is disposed approximately 60° apart from an adjacent ball member in the rotational plane of the opposed plates.

21. The load-equalizing differential in accordance with claim 19, wherein each plate is connected to a flexible connection connected with the respective brake member.

* * * * *

UNITED STATES PATENT AND TRADEMARK OFFICE
CERTIFICATE OF CORRECTION

PATENT NO. : 4,844,372
DATED : July 4, 1989
INVENTOR(S) : WEILER, JAMES G. ET AL It is certified that error appears in the above-identified patent and that said Letters Patent is hereby corrected as shown below:

Claim 1, Col. 4, Line 3, delete "of" and substitute therefor --- or ---;
Claim 11, Col. 6, Line 10, delete "ring" and substitute therefor --- spring means ---.
Claim 13, Col. 6, Line 43, delete "of" and substitute therefor --- or ---.
Claim 13, Col. 6, Lines 59-60, delete "projection" and substitute therefor --- projecting ---.
Claim 14, Col. 7, Line 15, delete "bores" and substitute therefor --- bore ---.
Claim 14, Col. 8, Line 10, delete "disposeds" and substitute therefor --- disposed ---.

Signed and Sealed this

Twenty-third Day of April, 1991

Attest:

HARRY F. MANBECK, JR.

*Attesting Officer*     *Commissioner of Patents and Trademarks*